Patented Sept. 1, 1936

2,052,672

UNITED STATES PATENT OFFICE 2,052,672

PROCESS FOR THE MANUFACTURE OF CONVERSION PRODUCTS OF RUBBER AND OF CHLORINATED AND BROMINATED PRODUCTS THEREOF

Frederick Stanley Shadbolt, Darwen, Lancashire, England, assignor to The Walpamur Company Limited, London, England, a British company No Drawing. Application February 18, 1933, Serial No. 657,474. In Great Britain March 16, 1932

9 Claims. (Cl. 260—1)

This invention concerns the manufacture of conversion products of rubber and concerns also the manufacture of chlorinated and brominated products obtained therefrom.

According to the invention the process for the manufacture of conversion products of rubber consist in treating either raw or milled rubber in the presence of a solvent with an agent which consists of or contains a compound comprising phosphorus, oxygen and chlorine, the proportion of oxygen in said compound being greater than that contained in phosphorus oxychloride ($POCl_3$), and may be constituted by the product obtained by the partial hydrolysis of phosphorus pentachloride or phosphorus oxychloride or a mixture of the same or by a residue obtained by distillation of a mixture of phosphorus pentachloride and/or phosphorus oxychloride and phosphoric acid for example orthophosphoric acid. The amount of the rubber is conveniently sufficient to yield about a 10% solution or dispersion by weight and the amount of agent is conveniently up to about 20% calculated on the weight of the rubber; with other suitable solvents such as those of the chlorinated type, the percentage by weight of rubber employed is less, approximately in proportion to the higher specific gravities of these solvents, so that the solutions or dispersions yielded are of approximately the same weight of rubber per volume of solvent as given for benzene. The agent may be mixed with the solvent and the rubber added thereto or the agent may be added to a solution or dispersion of rubber in the solvent. In practice it is found more convenient to add the rubber to the solvent containing the agent.

The agent may be prepared by the partial hydrolysis of phosphorus pentachloride or phosphorus oxychloride, preferably with water or water vapour, as, for example, in the case of phosphorus oxychloride, by the treatment of this substance with about five per cent or more of its weight of water, but substantially short, however, of the theoretical amount of water required for complete hydrolysis which is approximately 35 per cent; or the agent may be prepared by the addition of phosphoric acid, for example orthophosphoric acid, or solutions thereof to phosphorus pentachloride, or phosphorus oxychloride, the relationship of the amounts of the two components of these mixtures being regulated by the amount of water contained in the phosphoric acid or solution thereof; or, alternatively, the agent may be prepared in the form of the non-volatile viscous residue which results when any of the mixtures hereinbefore mentioned are evaporated or distilled.

The treatment of the solution or dispersion of rubber with the agent may be carried out at ordinary temperature or at higher temperatures below the boiling point of the solvent. To hasten the conversion, the treatment may, if desired, be carried out under the influence of ultra-violet rays, and in all cases mechanical agitation, though not essential, is a preferred adjunct to the process.

After some hours, the period depending mainly upon the amount of the agent employed, the treated solution or dispersion of rubber becomes thin in consistency and reddish-brown in color, and when all "gelled" masses have disappeared the solvent is removed by any convenient method such as by simple distillation, by distillation in vacuo, by steam distillation or by devices involving film or spray drying or alternatively, the solid may be obtained by precipitation in a non-solvent such as alcohol. At a convenient stage, either before or after the removal of the solvent, the conversion product is freed from mineral acids. This may, for example, be accomplished by washing the solution and/or the solid with water and/or alkaline solutions, a process facilitated by the use of mechanical appliances, and the washed material which contains only traces of phosphorus derivatives is suitably dried in vacuo or by other means.

The following examples in which the parts are by weight serve to illustrate how the process of this invention for the manufacture of conversion products of rubber may be carried into practice.

1. To 100 parts of phosphorus oxychloride 10 parts of water were slowly added and the product was slightly warmed to drive off excess hydrochloric acid gas and the agent was then allowed to cool.

To 2000 parts of commercially pure benzene 40 parts of the aforesaid agent were added and after the mixture had been agitated for a few minutes, 200 parts of raw rubber were added and agitation was continued for two hours. After standing a further ten hours at room temperature, liquefaction was complete. The mixture was steam distilled and the moist residue of converted rubber washed and dried in vacuo.

2. To 100 parts of phosphorus oxychloride 10 parts of water were slowly added and the product was distilled, leaving the agent as a viscous residue in the still.

To 1500 parts of commercially pure benzene were added 25 parts of the aforesaid viscous residue as agent and, after agitation for a short time, 150 parts of raw rubber were added and the whole was agitated for a further three hours. After standing for 24 hours at room temperature, the product had liquefied to a light brown solution of low viscosity. The solution was evaporated in a film drying device and the solid product was ground with dilute aqueous caustic soda in a ball mill and subsequently filtered off, washed with water and dried.

3. A mixture was made of 2000 parts of trichlorethylene with 20 parts of the agent in the form of partially hydrolyzed phosphorus oxychloride, prepared as described in Example 1, agitated for a few minutes, and to it was added 100 parts of milled rubber and agitation continued for some hours. When liquefaction was complete, the solvent was evaporated in a film drying apparatus and the solid product was subsequently ground and treated in the manner described in Example 2.

The conversion products of rubber obtained by means of this invention are tough and comparatively hard at room temperature, but which property can be modified to a variable degree with the aid of suitable plasticizing agents added thereto. Solutions of these products in most of the common solvents such as benzene hydrocarbons, chlorinated hydrocarbons, petroleum distillates, turpentine, esters and the like can be prepared in considerably higher concentrations and of much lower viscosities than is possible with raw or milled rubber. Such solutions can be obtained practically free from all discolouration, and when evaporated they give films which are notably transparent and devoid of opacity and "tackiness".

The conversion products of rubber produced according to this invention may be used commercially as thermo-plastic bodies and when dissolved in appropriate solvents with suitable plasticizers can be used for the production of films, sheets, ribbons and the like. Solutions of these conversion products with or without the addition of plasticizing agents, can be advantageously employed as coating or painting media, either alone or incorporated with known and recognized varnish or paint vehicles, in either case with or without the addition of pigments.

It is known that raw or milled rubber dissolved or dispersed in suitable solvents or swelling agents can be treated with chlorine to produce a commercially useful substance generally known as chlorinated rubber. The means so far proposed or employed in the chlorination of rubber in a solvent have the defect that during the early stages of the reaction a relatively insoluble intermediate modification of chlorinated rubber is formed. Where the original solution or dispersion of rubber is of low concentration, say about two or three per cent, the insoluble partially chlorinated rubber is precipitated in a flocculent state; but with a solution or dispersion containing about ten per cent of rubber—a concentration which is more desirable from a practical standpoint—the insoluble modification of chlorinated rubber forms a sponge-like or gelatinous mass.

In either case the formation of the insoluble modification hinders the smooth course of the reaction producing the soluble form of chlorinated rubber, because it impairs the intimate contact of the reactants, especially when high concentrations are used, as the insoluble modification then formed is very tenacious. Because of this phenomenon, it is difficult even under well controlled conditions, to obtain, and still more to reproduce, even moderately satisfactory results.

It has been found, however, according to this invention that solutions or dispersions of rubber subjected to the conversion treatment hereinbefore described become much less viscous and are very amenable to chlorination.

According to this invention the process for manufacturing chlorinated conversion products of rubber consists in subjecting the conversion products of rubber obtained in accordance with the process hereinbefore described to chlorination.

It should be understood that in this case the solvent should be such that it is not adversely affected, from the standpoint of the process, by the halogen employed.

The chlorination may be carried out at ordinary temperatures, or if desired, at higher temperatures, and basic substances, such as sodium carbonate and/or water may be added to the solution of converted rubber before and/or during the chlorination.

When chlorination is complete, the solvent is removed in any convenient manner, for example by simple distillation or by distillation in vacuo or by steam distillation or by devices for film or spray drying or alternatively, the solid may be obtained by precipitation in a non-solvent such as alcohol. The chlorinated product is freed from excess of chlorine and free mineral acids by treatment before and/or after the removal of the solvent, with water or alkaline solutions, a process facilitated by the use of mechanical appliances, and the washed material which contains only traces of phosphorus derivatives is suitably dried in vacuo or by other means.

The following examples in which the parts are by weight serve to illustrate how the process of the invention for the manufacture of chlorinated conversion products of rubber may be carried into practice:

4. Ten parts of water were slowly added to 100 parts of phosphorus oxychloride, and the product was slightly warmed to drive off excess hydrochloric acid gas and then allowed to cool. 40 parts of the agent so prepared were added to 2000 parts of commercially pure benzene, the mixture agitated for a few minutes, and to it were added 200 parts of raw rubber and agitation continued for a few hours. After standing overnight, thinning of the solution was complete, and it was then agitated with 100 parts of water and chlorine gas was passed through the mixture. After passage of the gas through the mixture for approximately two hours the solvent was removed by steam distillation, and the moist mass of chlorinated product was washed free from mineral acids and dried in vacuo. The product pluverized to a pale yellow powder and when tested showed 36 per cent of combined chlorine.

5. To 100 parts of phosphorus oxychloride 10 parts of water were slowly added and the product was distilled leaving a viscous residue in the still.

30 parts of this viscous residue were added to 2000 parts of commercially pure benzene and after agitation for a short while, 200 parts of raw rubber were added and the whole agitated for a few hours. After standing at room temperature for 24 hours the product had liquefied to a light brown solution of low viscosity. The solution was then agitated with 40 parts of solid sodium carbonate and chlorinated. Thereafter the solvent was evaporated off in a suitable film drying apparatus and the solid product was ground with a dilute solution of caustic soda in a ball mill. The pulverized product thus obtained was filtered off, washed with water and dried.

6. To 100 parts of phosphorus oxychloride were slowly added 30 parts of phosphoric acid (sp. gr. 1.500) and after the evolution of hydrochloric acid gas had subsided, the mixture was heated for a short time.

30 parts of this mixture were added to 1500 parts of commercially pure benzene with agitation and then 150 parts of raw rubber were introduced and agitation was continued for 4 hours. The product after standing for several hours was found, in spite of the presence of some "gelled" masses, to chlorinate smoothly and completely to a liquid of low viscosity, the "gelled" masses disappearing rapidly during chlorination. The chlorinated solids in this solution were recovered as in the previous Example 5 by means of a film drying apparatus and were subsequently treated as therein described, giving a satisfactory product as regards chlorine content and solubility in appropriate solvents.

By means of this invention several advantages are secured. Chlorination is effected smoothly and without the formation of precipitates or gels of insoluble modifications of chlorinated rubber such as those hereinbefore referred to. Moreover, solutions or dispersions of higher rubber content than usual may be employed. Thus, for example, benzene containing ten per cent of raw rubber is in a highly viscous or gelled condition which is quite unsuitable for satisfactory chlorination. As the foregoing examples show, by the addition of the agent in the proportions indicated to the same quantities of benzene and rubber, the ultimate product is a solution of remarkably low viscosity. This change of physical state renders the solution or dispersion of rubber more suitable for the action of the chlorine, the mere passage of the gas through the liquid causing sufficient agitation for the purpose of the reaction. This agitation and the reaction is facilitated still further as chlorination proceeds since the liquid becomes much thinner and finally yields a solution which is pale in colour and of very low viscosity.

A further advantage is that no excess of chlorine much above the theoretical requirement is necessary, because chlorination is readily effected; whereas in the absence of the agent a large excess of chlorine is required to obtain the soluble modification of chlorinated rubber.

Yet another advantage is that since the reaction of chlorination of the conversion product of rubber proceeds rapidly and is of comparatively short duration, the possibility of chlorinating the solvent, as for example, in the case of benzene hydrocarbons, is reduced to a minimum and consequently these comparatively cheap solvents can be used instead of the more expensive solvents of the chlorinated hydrocarbon type such as carbon tetrachloride, trichlorethylene and the like.

Finally, the process according to this invention has the advantage that the chlorinated products, even at 30 per cent chlorine content, are more soluble in appropriate solvents such as benzene, toluene, xylene, solvent naphtha and the like, than the products hitherto prepared containing 60 per cent or more of chlorine. Moreover, the chlorinated products obtained by this invention yield, in benzene and its homologues, halogenated hydrocarbons and the like, solutions that are free from "tackiness" and even in concentrations up to 30 to 40 per cent of solids still have a relatively low viscosity. Such solutions with or without the addition of plasticizing agents, can be used as varnishes or lacquers, or as the basis of other types of painting or coating materials, and also as mediums for electrical insulating purposes.

The chlorinated products obtained by this invention can with the addition of suitable plasticizers and with or without the use of suitable fillers or pigments, be moulded under heat and pressure.

It should be understood that in a modification of the processes of this invention the chlorine in the compounds specified may be substituted wholly or in part by bromine or mixtures of the specified chlorine compounds and the equivalent bromine compounds may be employed. Furthermore chlorination of the conversion products may be replaced by bromination.

What I claim is:—

1. A process for the manufacture of conversion products of rubber which consists in treating rubber in the presence of a solvent with at least one compound comprising phosphorus, oxygen and chlorine in which compound the proportion of oxygen is greater than that contained in phosphorus oxychloride ($POCl_3$).

2. A process for the manufacture of conversion products of rubber which consists in treating rubber in the presence of a solvent with an agent containing at least one compound comprising phosphorus, oxygen and chlorine in which compound the proportion of oxygen is greater than that contained in phosphorus oxychloride ($POCl_3$).

3. A process for the manufacture of conversion products of rubber which consists in treating rubber in the presence of a solvent with at least one compound comprising phosphorus, oxygen and bromine in which compound the proportion of oxygen is greater than that contained in phosphorus oxybromide ($POBr_3$).

4. A process for the manufacture of conversion products of rubber which consist in treating rubber in the presence of a solvent with an agent containing at least one compound comprising phosphorus, oxygen and bromine in which compound the proportion of oxygen is greater than that contained in phosphorus oxybromide ($POBr_3$).

5. A process for the manufacture of conversion products of rubber which consists in treating rubber in the presence of a solvent with an agent constituted by the partial hydrolysis of at least one compound selected from the group consisting of phosphorus pentachloride, phosphorus oxychloride, phosphorus pentabromide and phosphorus oxybromide.

6. A process for the manufacture of conversion products of rubber which consists in treating rubber in the presence of a solvent with an agent constituted by a residue obtained by distillation of a mixture of a phosphoric acid and at least one compound selected from the group consisting of phosphorus pentachloride, phosphorus oxychloride, phosphorus pentabromide and phosphorus oxybromide.

7. As a new article of manufacture, a conversion product of rubber that is readily soluble in petroleum spirit and which has been prepared by treating rubber in the presence of a solvent with a compound comprising phosphorus, oxygen, and one of the halogens, chlorine and bromine, in which compound the proportion of oxygen is greater than that contained in the phosphorus oxyhalide ($POX_3$ in which X represents the halogen) corresponding to the halogen present in said compound.

8. As a new article of manufacture, a conversion product of rubber that is readily soluble in petroleum spirit and which has been prepared by treating rubber in the presence of a solvent with a compound comprising phosphorus, oxygen and chlorine in which compound the proportion of oxygen is greater than that contained in phosphorus oxychloride ($POCl_3$).

9. As a new article of manufacture, a conversion product of rubber that is readily soluble in petroleum spirit and which has been prepared by treating rubber in the presence of a solvent with a compound comprising phosphorus, oxygen and bromine in which compound the proportion of oxygen is greater than that contained in phosphorus oxybromide ($POBr_3$).

FREDERICK STANLEY SHADBOLT.